United States Patent
Alameldeen et al.

(10) Patent No.: US 10,802,883 B2
(45) Date of Patent: Oct. 13, 2020

(54) METHOD, SYSTEM, AND DEVICE FOR NEAR-MEMORY PROCESSING WITH CORES OF A PLURALITY OF SIZES

(71) Applicant: INTEL CORPORATION, Santa Clara, CA (US)

(72) Inventors: Alaa R. Alameldeen, Hillsboro, OR (US); Berkin Akin, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 132 days.

(21) Appl. No.: 16/107,215

(22) Filed: Aug. 21, 2018

(65) Prior Publication Data

US 2019/0041952 A1   Feb. 7, 2019

(51) Int. Cl.
| | | |
|---|---|---|
| *G06F 9/50* | (2006.01) | |
| *G06F 9/48* | (2006.01) | |
| *G06F 1/329* | (2019.01) | |
| *G06F 13/42* | (2006.01) | |
| *G06F 1/3287* | (2019.01) | |
| *G06F 1/3206* | (2019.01) | |

(52) U.S. Cl.
CPC .......... *G06F 9/5044* (2013.01); *G06F 1/3206* (2013.01); *G06F 1/329* (2013.01); *G06F 1/3287* (2013.01); *G06F 9/48* (2013.01); *G06F 9/485* (2013.01); *G06F 9/4806* (2013.01); *G06F 9/4843* (2013.01); *G06F 9/4856* (2013.01); *G06F 9/4881* (2013.01); *G06F 9/50* (2013.01); *G06F 9/5005* (2013.01); *G06F 9/5027* (2013.01); *G06F 13/4234* (2013.01)

(58) Field of Classification Search
CPC . G06F 9/48; G06F 9/50; G06F 9/4806; G06F 9/4843; G06F 9/485; G06F 9/4856; G06F 9/4881; G06F 9/5005; G06F 9/5027; G06F 9/5044
See application file for complete search history.

(56) References Cited

U.S. PATENT DOCUMENTS

| | | | |
|---|---|---|---|
| 10,565,131 B2* | 2/2020 | Chung | G06F 12/1009 |
| 2009/0222654 A1* | 9/2009 | Hum | G06F 1/3206 |
| | | | 713/100 |

(Continued)

OTHER PUBLICATIONS

Ahn, J., et al., "A Scalable Processing-in-Memory Accelerator for Parallel Graph Processing", International Symposium on Computer Architecture (ISCA), Jun. 2015, 3 pp.

(Continued)

*Primary Examiner* — Charles M Swift
(74) *Attorney, Agent, or Firm* — Konrad Raynes Davda & Victor LLP; Rabindranath Dutta

(57) ABSTRACT

A device is configured to be in communication with one or more host cores via a first communication path. A first set of processing-in-memory (PIM) cores and a second set of PIM cores are configured to be in communication with a memory included in the device over a second communication path, wherein the first set of PIM cores have greater processing power than the second set of PIM cores, and wherein the second communication path has a greater bandwidth for data transfer than the first communication path. Code offloaded by the one or more host cores are executed in the first set of PIM cores and the second set of PIM cores.

14 Claims, 9 Drawing Sheets

(56) References Cited

U.S. PATENT DOCUMENTS

| | | | | |
|---|---|---|---|---|
| 2015/0058650 A1* | 2/2015 | Varma | ................... | G06F 1/3293 |
| | | | | 713/324 |
| 2015/0113536 A1* | 4/2015 | Liu | ....................... | G06F 9/5094 |
| | | | | 718/102 |
| 2016/0098200 A1* | 4/2016 | Guz | ......................... | G06F 7/00 |
| | | | | 711/154 |
| 2017/0185452 A1* | 6/2017 | Cao | ....................... | G06F 9/5066 |
| 2018/0336035 A1* | 11/2018 | Choi | ........................ | G06F 9/35 |

OTHER PUBLICATIONS

Akin, B., et al., "Data Reorganization in Memory Using 3D-Stacked DRAM", 42nd Annual International Symposium on Computer Architecture (ISCA), Jun. 2015, 13 pp.

Gao, M., et al., "Practical Near-Data Processing for In-Memory Analytics Frameworks", 2015 International Conference on Parallel Architecture and Compilation (PACT), 2015, 12 pp.

Gao, M., et al., "Tetris: Scalable and Efficient Neural Network Acceleration with 3d Memory", Proceedings of the Twenty-Second International Conference on Architectural Support for Programming Languages and Operating Systems, Apr. 2017, 14 pp.

Pugsley, S.H., et al., "NDC: Analyzing the Impact of 3D-Stacked Memory+Logic Devices on MapReduce Workloads", 2014 IEEE International Symposium on Performance Analysis of Systems and Software (ISPASS), 2014, 11 pp.

Zhang, D.P., et al. "TOP-PIM: Throughput-Oriented Programmable Processing in Memory", Proceedings of the 23rd International Symposium on High-Performance Parallel and Distributed Computing, Jun. 2014, 13 pp.

Zhu, Q., et al., "A 3D-Stacked Logic-In-Memory Accelerator for Application-Specific Data Intensive Computing", 2013 IEEE International 3D Systems Integration Conference (3DIC), 2013, 7 pp.

\* cited by examiner

METHOD, SYSTEM, AND DEVICE FOR NEAR-MEMORY PROCESSING WITH CORES OF A PLURALITY OF SIZES

BACKGROUND

Near-Memory Processing (NMP) is a mechanism in which processing units and memory units of a device are maintained physically close together in order to reduce the latency and cost inherent in transferring data between processing units and memory units. In high performance computing environments that execute data-intensive applications, by reducing the physical distance between the location at which data is stored and the location at which data is processed, the results from the processing of data may be obtained relatively faster.

The processing units that are maintained physically close together to memory units in near-memory processing are referred to as Processing-In-Memory (PIM) cores. Data transfer rate between PIM cores and the memory units is relatively higher in comparison to the data transfer rate from external Central Processing Units (CPU) to the memory units, where the external CPUs are located at a greater physical distance from the memory units than the PIM cores.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments provide mechanisms for providing PIM cores of different sizes for near-memory processing. A relatively smaller number of large sized PIM cores are used for executing tasks that are best suited for sequential processing, whereas a relatively larger number of small sized PIM cores are used for executing tasks in parallel.

Figure 1:
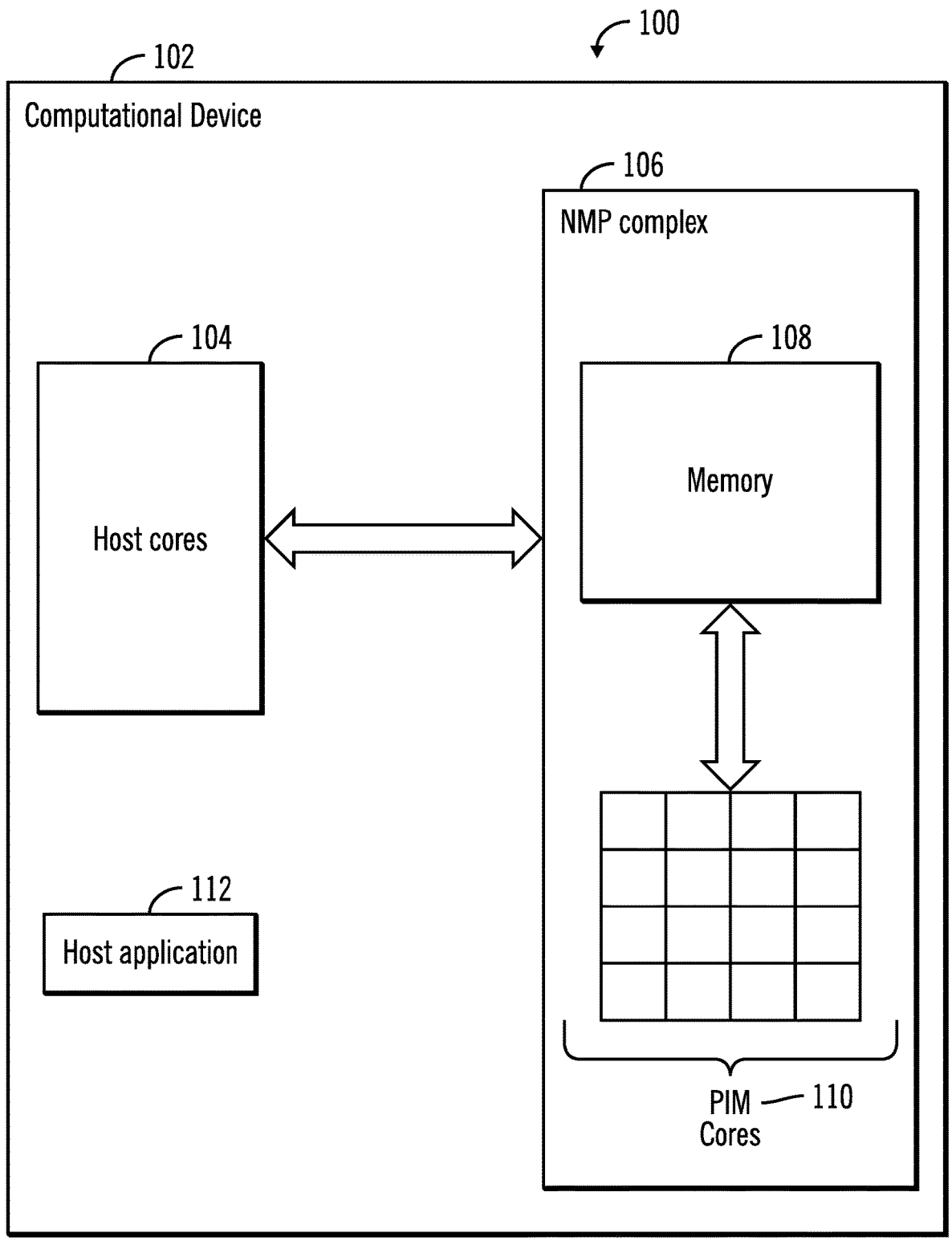
FIG. 1 illustrates a block diagram of a computing environment in which all PIM cores are equal in size in a NMP complex, in accordance with certain embodiments.

FIG. 1 illustrates a block diagram of a computing environment 100 in which all PIM cores are equal in size in a NMP complex, in accordance with certain embodiments. In the computing environment 100, a computational device 102 includes one or more host cores 104 that are coupled to a NMP complex 106 comprising a memory 108 and a plurality of PIM cores 110, where each of the plurality of PIM cores 110 are the same in size, i.e., each of the plurality of PIM cores 110 have identical processing capabilities in terms of processing speed of instructions. A core is a processing unit that reads in instructions to perform specific actions, and host cores and PIM cores are different types of processing units.

A host application 112 may offload code to the NMP complex 106 for execution on the NMP complex 106 rather than on the host cores 104. The tasks generated from the offloaded code are executed in the plurality of PIM cores 110.

Figure 2:
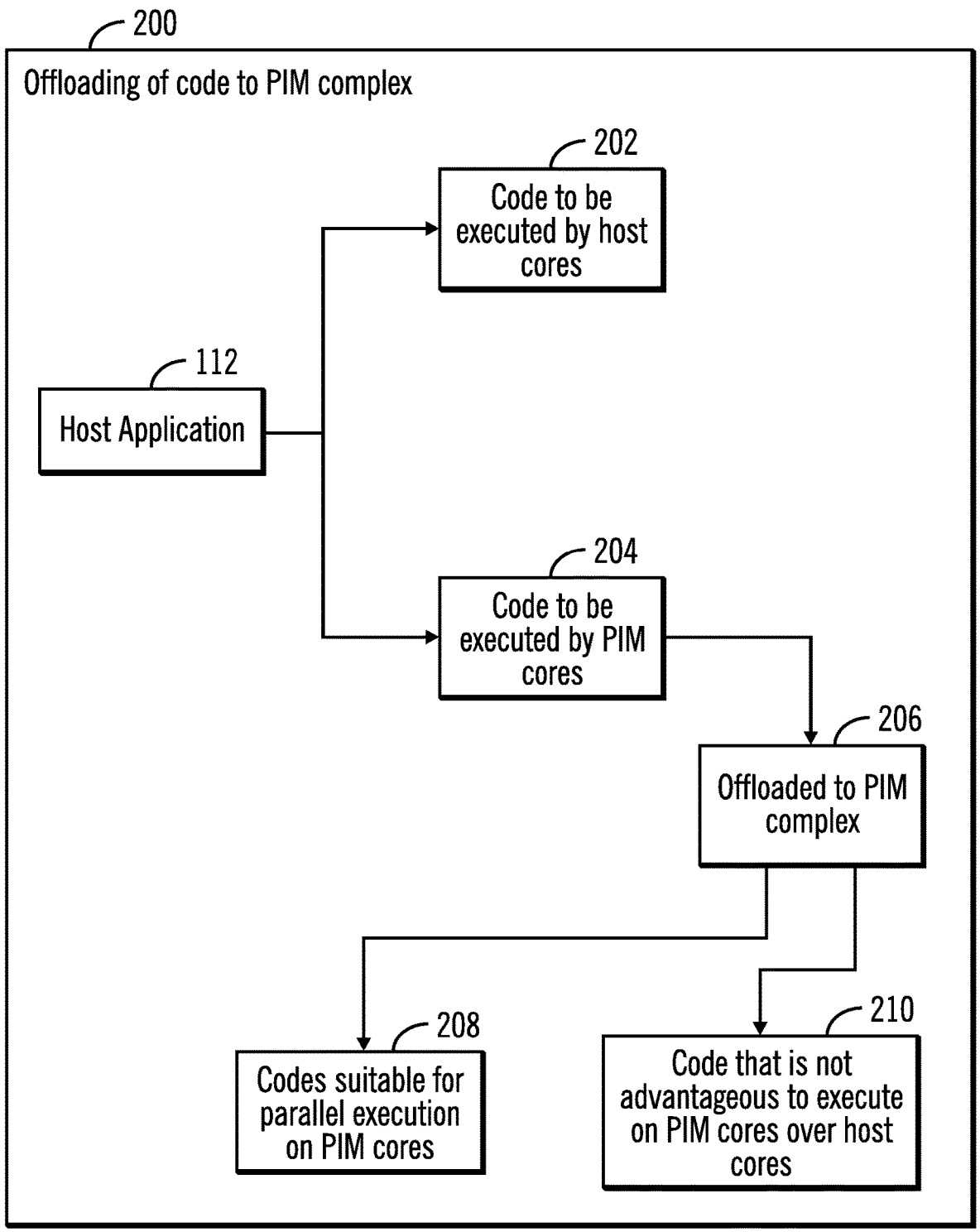
FIG. 2 illustrates a block diagram that shows the offloading of code to a PIM complex for execution, in accordance with certain embodiments.

FIG. 2 illustrates a block diagram 200 that shows the offloading of code to the NMP complex 106 for execution, in accordance with certain embodiments.

The host application 112 may separate out code to be executed in the computational device 102 into code to be executed by the host cores 104 (as shown via reference numeral 202) and into code to be executed by the PIM cores 110 (as shown via reference numeral 204). The host application 112 offloads the code to be executed by PIM cores 110 to the NMP complex 106 (as shown via reference numeral 206).

However, in certain situations the code offloaded to the NMP complex 106 may include both code that is suitable for parallel execution on the PIM cores 110 (as shown via reference numeral 208) and code that is not advantageous to execute on PIM cores 110 in comparison to the host cores 104 (as shown via reference numeral 210). This occurs because the host application 112 may not be able to correctly separate out code into code segments that are advantageous to execute on the host cores and code segments that are advantageous to execute on the PIM cores. As a result, code which is not suitable for execution in parallel on the equal sized PIM cores 110 may have to be executed in the equal sized PIM cores 110. For example, each of the PIM cores 110 are relatively small in size, and a computationally intensive task may need a large sized PIM core for sequential execution if the computationally intensive task is not parallelizable. The computationally intensive task may not gain any advantage by being executed in a relatively small sized PIM core that is proximate to the memory 108, in comparison to being executed in the host cores 104. However, returning the computational intensive task to the host cores 104 would also consume bandwidth and cause a reduction in the speed of data processing in the computing environment 100.

Figure 3:
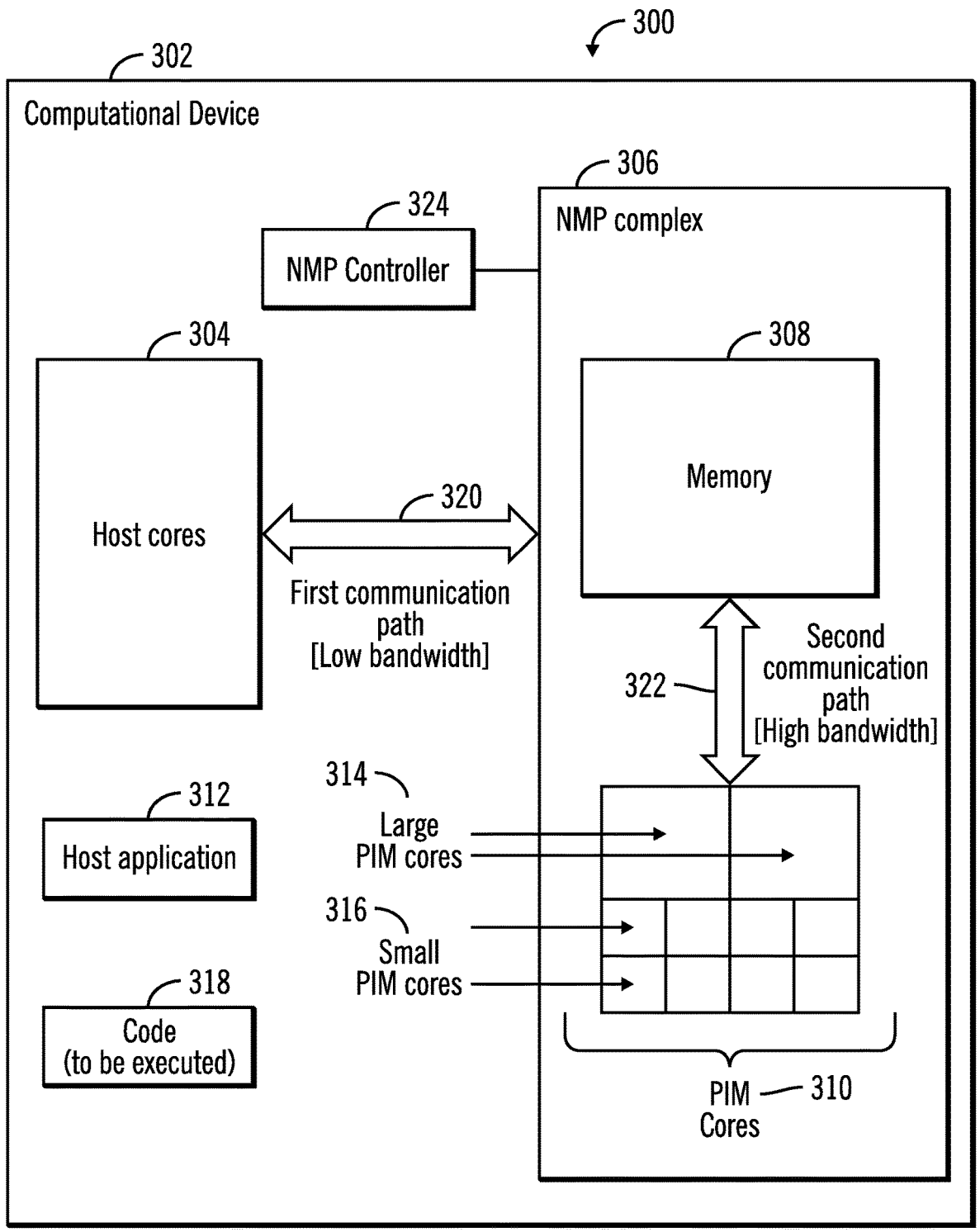
FIG. 3 illustrates a block diagram of a computing environment in which both large PIM cores and small PIM cores are maintained in a NMP complex, in accordance with certain embodiments.

FIG. 3 illustrates a block diagram of a computing environment 300 in which both large PIM cores and small PIM cores are maintained in a NMP complex, in accordance with certain embodiments. In contrast to the computing environment 100 in which all PIM cores are equal in size in a NMP complex, in the computing environment 300 not all PIM cores are equal in size in a NMP complex.

In the computing environment 300, a computational device 302 includes one or more host cores 304 that are coupled to a NMP complex 306 comprising a memory 308 and a plurality of PIM cores 310, where the plurality of PIM cores 310 are not all the same in size, i.e., not all of the plurality of PIM cores 310 have identical processing capabilities in terms of processing speed of instructions. For example, some of the PIM cores are relatively large PIM cores 314 with greater processing capabilities than the small PIM cores 216.

The computational device 302 may be any computational device including those presently known in the art, such as, a personal computer, a workstation, a server, a mainframe, a hand held computer, a palm top computer, a telephony device, a network appliance, a blade computer, a processing device, a controller, etc.

A host application 312 may offload part of the code 318 to the NMP complex 306 for execution on the NMP complex 306 rather than on the host cores 304. The tasks generated from the offloaded code are executed in the plurality of PIM cores 310.

A first communication path 320 is used to transfer data between the host cores 304 and the NMP complex 306. A second communication path 322 is used to transfer data between the memory 308 and the PIM cores 310. The second communication path 322 is of a higher bandwidth in terms of rate of data transfer in comparison the first communication path 320. The second communication path 322 may be referred to as a high bandwidth path and the first communication path 320 may be referred to as a low bandwidth path. The first communication path 320 is of a lower bandwidth is comparison to the second communication path 322 as the physical distance between the host cores 304 and the NMP complex 306 is greater than the physical distance between the memory 308 and the PIM cores 310 within the NMP complex 306.

In certain embodiments, even if the host application 312 offloads code that cannot be parallelized for execution in the small PIM cores 316, such code may be executed sequentially on the large PIM cores 314. By subdividing the area for PIM cores into large areas of large PIM cores and small areas for small PIM cores, provision is made in the NMP complex 306 to execute computationally intensive tasks rather than consume bandwidth by returning these tasks for execution by the host cores 304. An NMP controller 324 may control the operations performed by the NMP complex 306, where the NMP controller 324 may be present inside or outside of the NMP complex 306.

In certain embodiments the NMP complex may include volatile memory (e.g., Random Access Memory, Dynamic Random Access Memory, etc.) or non-volatile memory that comprise the memory 308. Non-volatile memory may comprise NAND components that may be comprised of a plurality of NAND dies. In certain alternative embodiments, the memory 308 may include a secure digital card, a multimedia card, a flash drive (for example, a Universal Serial Bus (USB) flash drive also known as a "USB thumb drive" or "USB memory stick" that includes non-volatile memory with an integrated USB interface), and other types of non-volatile or volatile storage devices.

In certain embodiments, memory 308 may be comprised of NAND memory. In certain embodiments the NAND memory may comprise a single-level cell (SLC) NAND, a multi-level cell (MLC) NAND, a triple-level cell (TLC) NAND, a quad-level cell (QLC) NAND or any other type of NAND or any other type of non-volatile memory. In other embodiments, the NMP complex 306 may be comprised of certain other types of volatile or non-volatile memory, such as NOR memory or some other suitable non-volatile memory. Non-volatile memory is a storage medium that does not require power to maintain the state of data stored by the storage medium. Nonlimiting examples of nonvolatile memory may include any or a combination of: solid state memory [such as planar or three Dimensional (3D) NAND flash memory or NOR flash memory], 3D crosspoint memory, storage devices that use chalcogenide phase change material (e.g., chalcogenide glass), byte addressable nonvolatile memory devices, multi-threshold level NAND flash memory, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), magnetic storage memory, single or multi-level Phase Change Memory (PCM), a resistive memory, nanowire memory, anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device. In some embodiments, 3D crosspoint memory may comprise a transistor-less stackable cross point architecture in which memory cells sit at the intersection of word lines and bit lines and are individually addressable and in which bit storage is based on a change in bulk resistance. A memory device may refer to the die itself and/or to a packaged memory product. In certain embodiments, a memory module with volatile or non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org).

Figure 4:
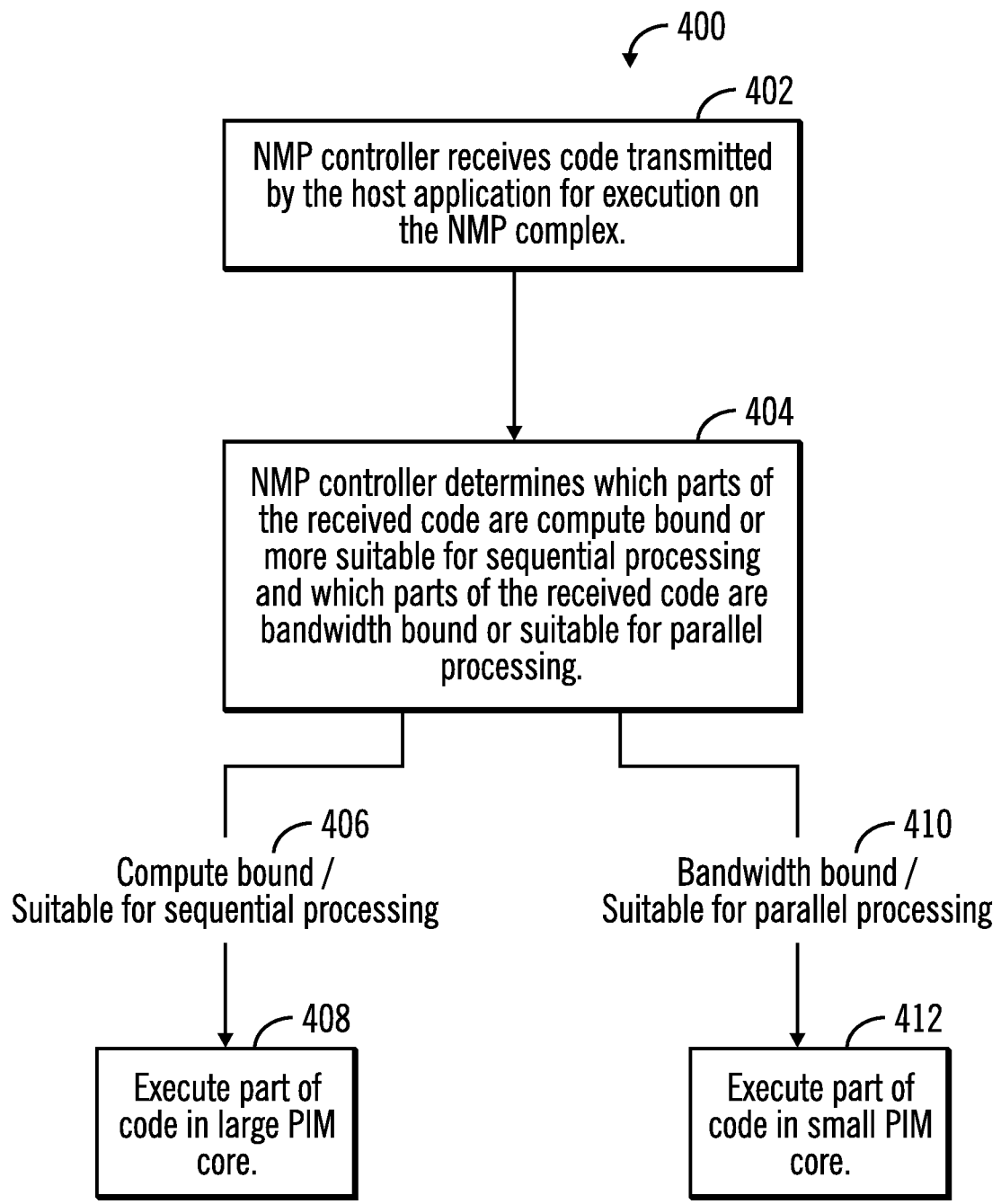
FIG. 4 illustrates a flowchart that shows which code segments are processed in large PIM cores and which code segments are processed in small PIM cores, in accordance with certain embodiments.

FIG. 4 illustrates a flowchart 400 that shows which code segments are processed in large PIM cores 314 and which code segments are processed in small PIM cores 316, in accordance with certain embodiments. The operations shown in FIG. 4 may be performed by the NMP complex 306 in association with the NMP controller 324.

Control starts at block 402 in which the NMP controller 324 receives code transmitted by the host application 312 for execution on the NMP complex 306. The NMP controller 324 determines (at block 404) which parts of the received code are compute bound or more suitable for sequential processing and which parts of the received code are bandwidth bound or suitable for parallel processing. Compute bound code is code that needs to perform a large amount of sequential computing operations without much need for transferring data to and from the memory 308. Bandwidth bound code is code that needs to have high bandwidth and is best processed in the NMP complex 306.

At block 404, if the NMP controller 324 determines that a part of the code is compute bound or suitable for sequential processing (branch 406), then the part of the code is executed in one or more of the large PIM cores 314 (at block 408). At block 404, if the NMP controller 324 determines that a part of the code is bandwidth bound or suitable for parallel processing (branch 410), then the part of the code is executed in one or more of the small PIM cores 316 (at block 412).

Therefore, FIG. 4 illustrates certain embodiments in which compute bound or sequential tasks are processed in large PIM cores 314, and bandwidth bound tasks or tasks amenable for parallel processing are processed in small PIM cores 316. The presence of large PIM cores 314 allow the NMP complex 306 to process compute bound and sequential tasks that are time consuming to process in the small PIM cores 316.

Figure 5:
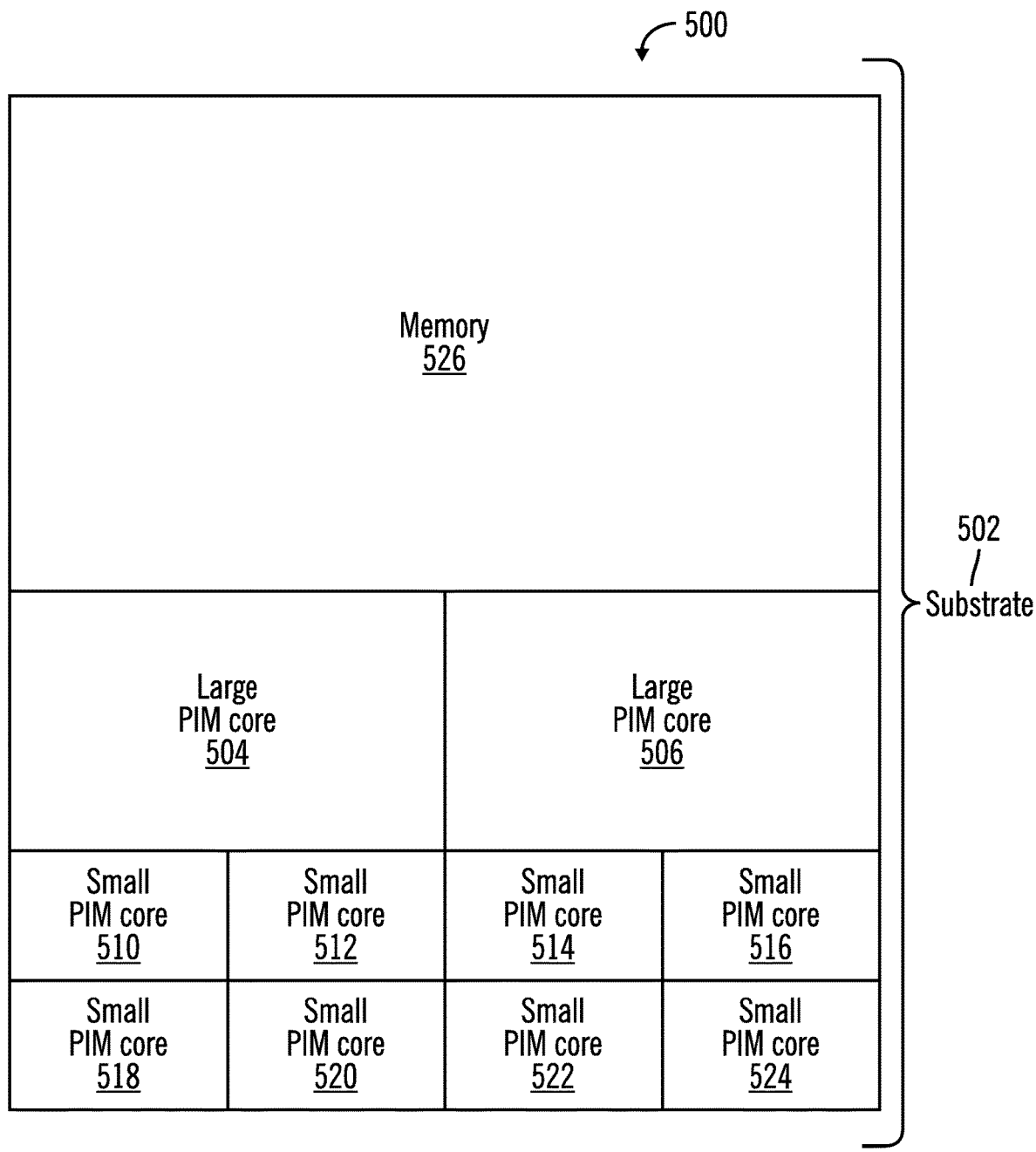
FIG. 5 illustrates a block diagram in which an area of a substrate is subdivided into large PIM cores and small PIM cores rather than into equal sized PIM cores, in accordance with certain embodiments.

FIG. 5 illustrates a block diagram 500 in which an area of a substrate 502 is subdivided into large PIM cores 504, 506 and small PIM cores 510, 512, 514, 516. 518. 520, 522, 524 rather than equal sized PIM cores, in accordance with certain embodiments. The memory 526 is also placed on the substrate. A substrate may include an area of silicon on which the memory and PIM cores are placed.

In a manufacturing mechanism, the silicon area allocated for PIM cores is divided into areas for a few large PIM cores and many small PIM cores. In certain embodiments, the small PIM cores are significantly greater in number (e.g., at least four times greater in number) than the large PIM cores, where the large PIM cores are significantly larger in size (e.g., at least four times larger in size) than the small PIM cores, and where PIM cores that are larger in size have a greater processing power than PIM cores that are smaller in size.

In certain embodiments, there may be small, medium, and large sized PIM cores for various types of tasks. Other variations in size and number of PIM cores may be implemented in certain alternative embodiments.

In certain embodiments, the large PIM cores are powered down, in response to a determination that the large PIM cores are not being utilized. In certain embodiments, the small PIM cores are powered down, in response to a determination that the small PIM cores are not being utilized. As a result, PIM cores that are not being used do not consume power.

Figure 6:
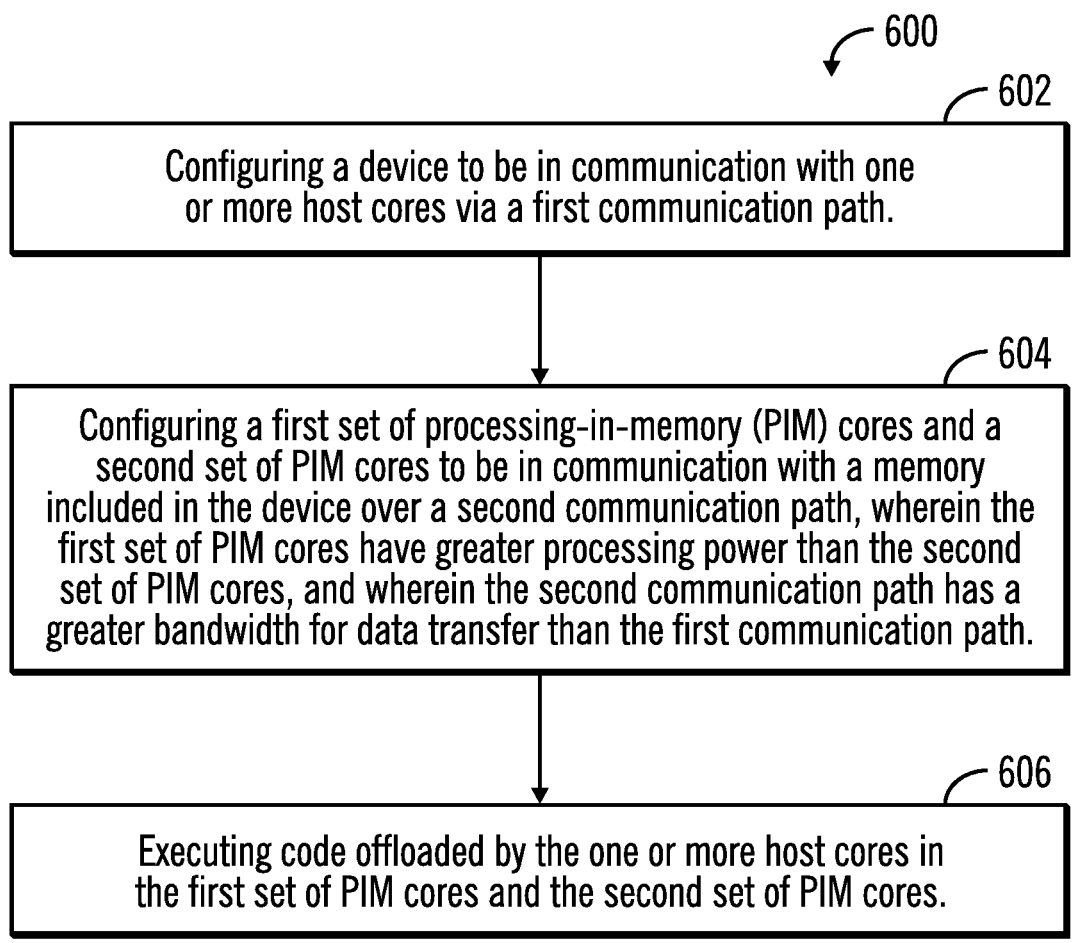
FIG. 6 illustrates a flowchart that shows operations performed in a NMP complex for executing offloaded code in large PIM cores and small PIM cores, in accordance with certain embodiments.

FIG. 6 illustrates a flowchart that shows operations performed in a NMP complex for executing offloaded code in large PIM cores and small PIM cores, in accordance with certain embodiments.

Control starts at block 602 in which a device (e.g., the NMP complex 306) is configured to be in communication with one or more host cores 304 via a first communication path 320 (e.g., the low bandwidth path 320).

A first set of processing-in-memory (PIM) cores (e.g., large PIM cores 314) and a second set of PIM cores (e.g., small PIM cores 316) are configured (at block 604) to be in communication with a memory 308 included in the device 306 (e.g., the NMP complex 306) over a second communication path 322 (e.g., the high bandwidth path 322), wherein the first set of PIM cores 314 have greater processing power than the second set of PIM cores 316, and wherein the second communication path 322 has a greater bandwidth for data transfer than the first communication path 320. Code offloaded by the one or more host cores 304 are executed (at block 606) in the first set of PIM cores 314 and the second set of PIM cores 316. In certain embodiments the first set of PIM cores 314 that have greater processing power than the second set of PIM cores 316 are larger in size than the second set of PIM cores 316.

Therefore, FIG. 6 illustrates certain embodiments in which there are large and small PIM cores coupled to the memory 308.

Figure 7:
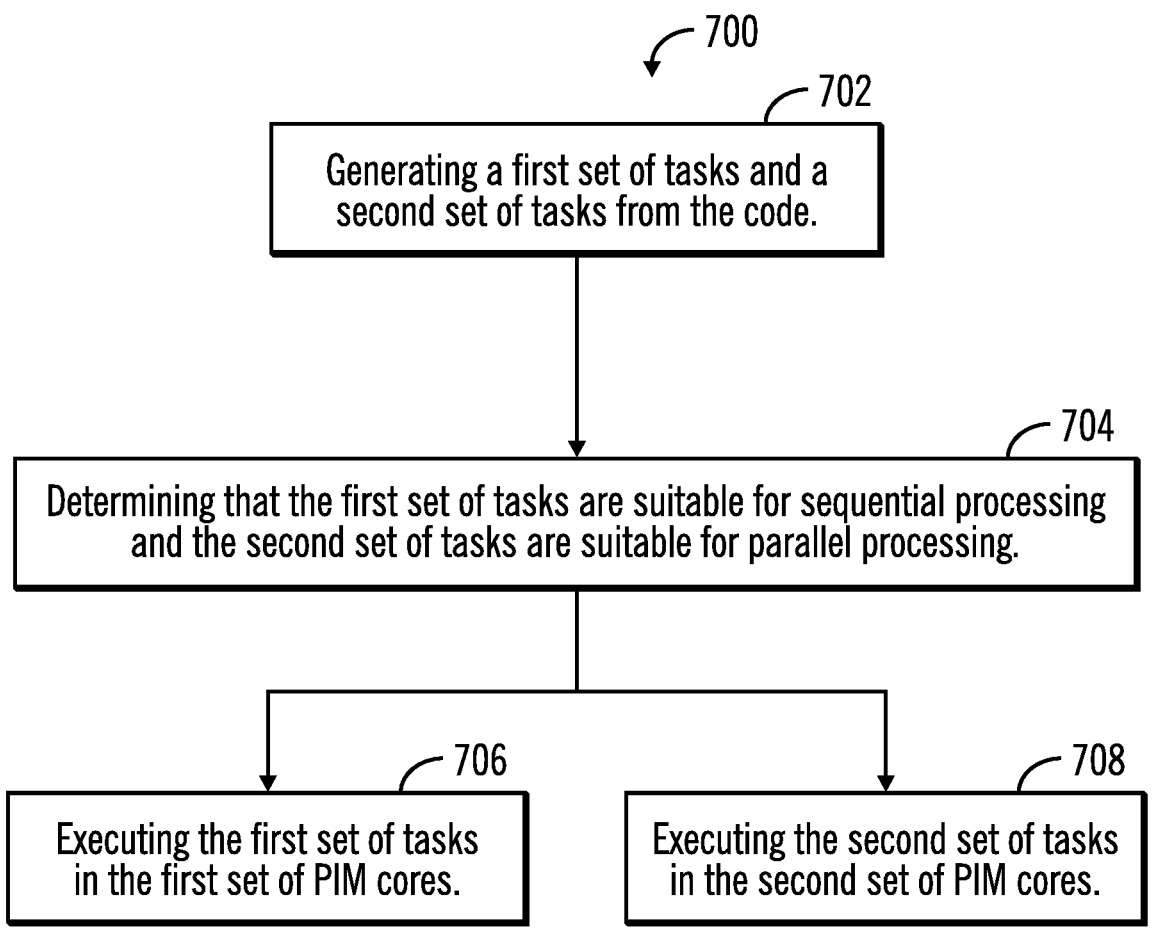
FIG. 7 illustrates a flowchart that shows operations performed in a NMP complex to execute tasks in small PIM cores and large PIM cores based on characteristics of the tasks, in accordance with certain embodiments.

FIG. 7 illustrates a flowchart 700 that shows operations performed in a NMP complex to execute tasks in small PIM cores and large PIM cores based on characteristics of the tasks, in accordance with certain embodiments.

Control starts at block 702 in which the controller 334 generates a first set of tasks and a second set of tasks from a code offloaded to the NMP complex 306. The controller 324 determines (at block 704) that the first set of tasks are suitable for sequential (and compute-heavy) processing and the second set of tasks are suitable for parallel (and bandwidth-heavy) processing. For the purposes of this disclosure the term "compute-heavy" means that significant processing power (e.g. those provided by large cores) is needed for processing, and compute-heavy tasks may be referred to as "compute-bound" tasks. Also for the purposes of this disclosure then term "bandwidth-heavy" means that significant movement of data is needed to and from memory while processing, and "bandwidth-heavy" tasks may be referred to as "bandwidth-bound" tasks.

From block 704 control proceeds in parallel to block 706 and 708. The controller 324 executes (at block 706) the first set of tasks in the first set of PIM cores (i.e., large PIM cores), and executes (at block 708) the second set of tasks in the second set of PIM cores (i.e., small PIM cores).

Therefore, FIG. 7 illustrates certain embodiments in which tasks suitable for sequential processing are executed in the large cores, and tasks suitable for parallel processing are executed in the small cores.

Figure 8:
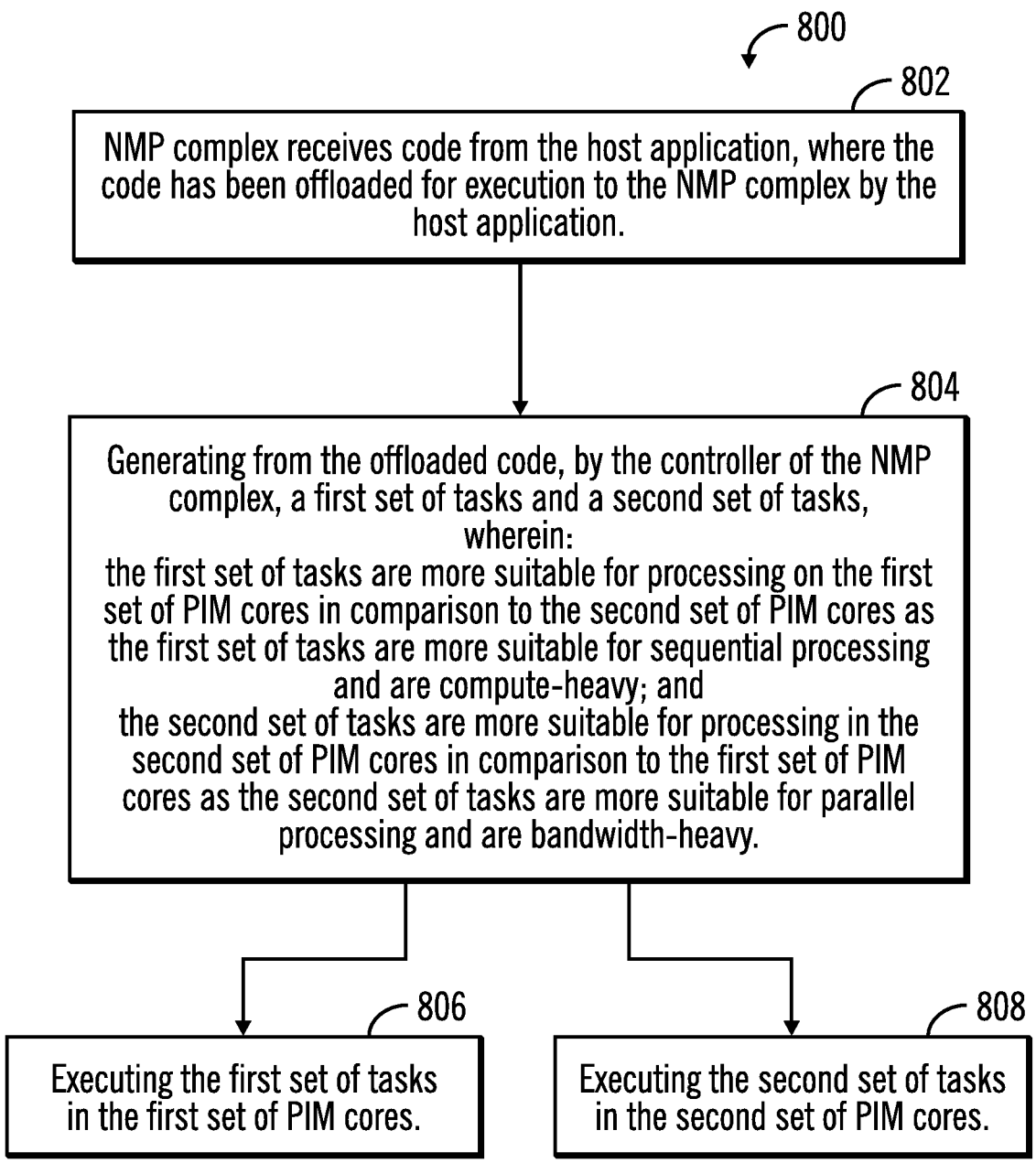
FIG. 8 illustrates a flowchart that shows operations performed in a NMP complex to execute tasks in small PIM cores and large PIM cores based on characteristics of the tasks, in accordance with certain embodiments.

FIG. 8 illustrates a flowchart 800 that shows operations performed in a NMP complex to execute tasks in small PIM cores and large PIM cores based on characteristics of the tasks, in accordance with certain embodiments.

Control starts at block 802 in which the NMP complex 306 receives code from the host application 312, where the code has been offloaded for execution to the NMP complex 306 by the host application 312.

From block 802 control proceeds to block 804 in which the controller 324 of the NMP complex 306 determines which parts of the received code are suitable for sequential processing and are compute-heavy and maps such parts of the received code to a first set of tasks. The controller 324 (e.g., NMP controller 324) of the NMP complex 306 also determines which parts of the received code are suitable for parallel processing and are bandwidth-heavy and maps such parts of the received code to a second set of tasks.

From block 804 control proceeds in parallel to block 806 and 808. The controller 324 executes (at block 806) the first set of tasks in the first set of PIM cores (large PIM cores) 314, and executes (at block 808) the second set of tasks in the second set of PIM cores (small PIM cores) 316.

It should be noted that the code offloaded by the host application 312 to the NMP complex 306 includes certain code segments that the controller 324 of the NMP complex 306 determines to be more suitable for sequential processing (and are compute-heavy) and maps such code segments to the first set of tasks for execution on the first set of PIM cores (large PIM cores). The code offloaded by the host application 312 to the NMP complex 306 includes certain code segments that the controller 324 of the NMP complex 306 determines to be more suitable for parallel processing (and are bandwidth-heavy) and maps such code segments to the second set of tasks for execution on the second set of PIM cores (small PIM cores).

The purpose of the device 306 is primarily to process tasks that are parallelizable and not compute-heavy as evidenced by the large number of small PIM cores in the device 306 and also because the host application 312 attempts to offload code that is likely to benefit from the architecture of the device 306. However, the host application 312 may not always be able to offload only the code that is suitable for parallelization and is bandwidth-heavy, and the large PIM cores 314 of the NMP complex 306 are used to process the code that is not suitable for parallelization and is compute-heavy.

Therefore, FIG. 8 illustrates certain embodiments in which tasks that are unsuitable for being processed in the small cores are executed in the large cores, by analyzing the code offloaded to the NMP complex.

Therefore, FIGS. 1-8 illustrate certain embodiments, in which by having a few relatively large cores in the NMP complex, code segments that are not suitable for processing on small cores of the NMP complex are processed in the NMP complex without returning the code segments to the host cores.

The described operations may be implemented as a method, apparatus or computer program product using standard programming and/or engineering techniques to produce software, firmware, hardware, or any combination thereof. The described operations may be implemented as code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Drives (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals. Those skilled in the art will recognize that many modifications may be made to this configuration, and that the article of manufacture may comprise suitable information bearing medium known in the art.

Computer program code for carrying out operations for aspects of the certain embodiments may be written in any combination of one or more programming languages. Blocks of the flowchart and block diagrams may be implemented by computer program instructions.

Figure 9:
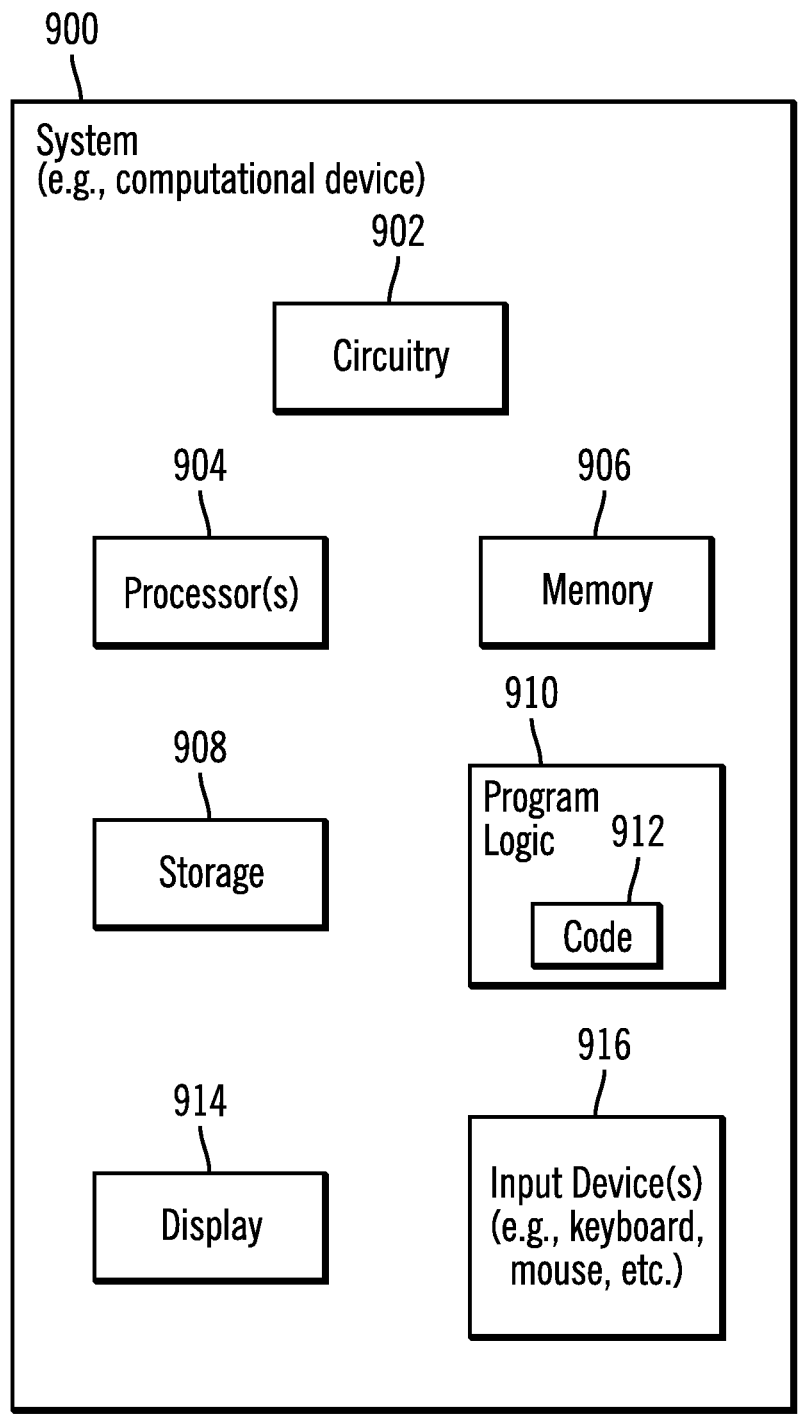
FIG. 9 illustrates a block diagram of a system, in accordance with certain embodiments.

FIG. 9 illustrates a block diagram of a system 900 that includes the computational device 102, 302, in accordance with certain embodiments. For example, in certain embodiments the system 900 may be a computer (e.g., a laptop computer, a desktop computer, a tablet, a cell phone or any other suitable computational device) that NMP complex 106 included in the system 900. For example, in certain embodiments the system 900 may be a laptop computer that includes the NMP complex 306. The system 900 may include a circuitry 902 that may in certain embodiments include at least a processor 904. The system 900 may also include a memory 906 (e.g., a volatile memory device), and storage 908. The storage 908 may include the memory 308 or other drives or devices including a non-volatile memory device (e.g., EEPROM, ROM, PROM, flash, firmware, programmable logic, etc.). The storage 908 may also include a magnetic disk drive, an optical disk drive, a tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902. The system 900 may also include a display 914 (e.g., a liquid crystal display (LCD), a light emitting diode (LED) display, a cathode ray tube (CRT) display, a touchscreen display, or any other suitable display). The system 900 may also include one or more input devices 916, such as, a keyboard, a mouse, a joystick, a trackpad, or any other suitable input devices. Other components or devices beyond those shown in FIG. 9 may also be found in the system 900.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

EXAMPLES

The following examples pertain to further embodiments.

Example 1 is a device that is configurable to be in communication with one or more host cores via a first communication path. The device comprises a substrate, comprising: a memory; a first set of processing-in-memory (PIM) cores; a second set of PIM cores, wherein the first set of PIM cores have greater processing power than the second set of PIM cores; and a second communication path coupling the first set of PIM cores and the second set of PIM cores to the memory, wherein the second communication path has a greater bandwidth for data transfer than the first communication path, and wherein the device is configurable to execute a code offloaded by the one or more host cores in the first set of PIM cores and the second set of PIM cores.

In example 2, the subject matter of example 1 may include that the second set of PIM cores are greater in number than the first set of PIM cores.

In example 3, the subject matter of example 1 may include that the first set of PIM cores that have greater processing power than the second set of PIM cores are larger in size than the second set of PIM cores.

In example 4, the subject matter of example 1 may include that a first set of tasks and a second set of tasks are generated from the code, wherein the first set of tasks are determined suitable for sequential processing and are compute-bound and the second set of tasks are determined suitable for parallel processing and are bandwidth-bound, and wherein the first set of tasks are executed in the first set of PIM cores, and the second set of tasks are executed in the second set of PIM cores.

In example 5, the subject matter of example 1 may include that a first set of tasks and a second set of tasks are generated from the code, wherein the first set of tasks are more suitable for processing on the host cores in comparison to the device, but code segments corresponding to the first set of tasks have been offloaded by the host cores to the device via the code, wherein the second set of tasks are more suitable for processing in the device in comparison to the first set of tasks, and wherein the first set of tasks are executed in the first set of PIM cores, and the second set of tasks are executed in the second set of PIM cores.

In example 6, the subject matter of example 1 may include that the first set of PIM cores are powered down, in response to a determination that the first set of PIM cores are not being utilized, wherein the second set of PIM cores are powered down, in response to a determination that the second set of PIM cores are not being utilized.

Example 7 is a method in which a device is configured to be in communication with one or more host cores via a first communication path. A first set of processing-in-memory (PIM) cores and a second set of PIM cores are configured to be in communication with a memory included in the device over a second communication path, wherein the first set of PIM cores have greater processing power than the second set of PIM cores, and wherein the second communication path has a greater bandwidth for data transfer than the first communication path. Code offloaded by the one or more host cores is executed in the first set of PIM cores and the second set of PIM cores.

In example 8, the subject matter of example 7 may include that the second set of PIM cores are greater in number than the first set of PIM cores.

In example 9, the subject matter of example 7 may include that the first set of PIM cores that have greater processing power than the second set of PIM cores are larger in size than the second set of PIM cores.

In example 10, the subject matter of example 7 may include generating a first set of tasks and a second set of tasks from the code; determining that the first set of tasks are suitable for sequential processing and are compute-bound and the second set of tasks are suitable for parallel processing and are bandwidth-bound; executing the first set of tasks in the first set of PIM cores; and executing the second set of tasks in the second set of PIM cores.

In example 11, the subject matter of example 7 may include generating a first set of tasks and a second set of tasks from the code; determining that the first set of tasks are more suitable for processing on the host cores in comparison to the device, but code segments corresponding to the first set of tasks have been offloaded by the host cores to the device via the code; determining the second set of tasks are more suitable for processing in the device in comparison to the first set of tasks; executing the first set of tasks in the first set of PIM cores; and executing the second set of tasks in the second set of PIM cores.

In example 12, the subject matter of example 7 may include powering down the first set of PIM cores, in response to a determining that the first set of PIM cores are not being utilized; and powering down the second set of PIM cores, in response to a determining that the second set of PIM cores are not being utilized.

Example 13 is a system comprising: one or more host cores; a display; and a device configurable to be in communication with the one or more host cores via a first communication path, the device comprising: a substrate, comprising: a memory; a first set of processing-in-memory (PIM) cores; a second set of PIM cores, wherein the first set of PIM cores have greater processing power than the second set of PIM cores; and a second communication path coupling the first set of PIM cores and the second set of PIM cores to the memory, wherein the second communication path has a greater bandwidth for data transfer than the first communication path, and wherein the device is configurable to execute a code offloaded by the one or more host cores in the first set of PIM cores and the second set of PIM cores.

In example 14, the subject matter of example 13 may include that the second set of PIM cores are greater in number than the first set of PIM cores.

In example 15, the subject matter of example 13 may include that the first set of PIM cores that have greater processing power than the second set of PIM cores are larger in size than the second set of PIM cores.

In example 16, the subject matter of example 13 may include that a first set of tasks and a second set of tasks are generated from the code, wherein the first set of tasks are determined suitable for sequential processing and are compute-bound and the second set of tasks are determined suitable for parallel processing and are bandwidth-bound, and wherein the first set of tasks are executed in the first set of PIM cores, and the second set of tasks are executed in the second set of PIM cores.

In example 17, the subject matter of example 13 may include that a first set of tasks and a second set of tasks are generated from the code, wherein the first set of tasks are more suitable for processing on the host cores in comparison to the device, but code segments corresponding to the first set of tasks have been offloaded by the host cores to the device via the code, wherein the second set of tasks are more suitable for processing in the device in comparison to the first set of tasks, and wherein the first set of tasks are executed in the first set of PIM cores, and the second set of tasks are executed in the second set of PIM cores.

In example 18, the subject matter of example 13 may include that the first set of PIM cores are powered down, in response to a determination that the first set of PIM cores are not being utilized, wherein the second set of PIM cores are powered down, in response to a determination that the second set of PIM cores are not being utilized.

Example 19 is a method for manufacturing a device configurable to be in communication with one or more host cores via a first communication path, the method comprising: placing a memory in a first area of a substrate; and subdividing a second area of the substrate to store a first set of processing-in-memory (PIM) cores and a second set of PIM cores, wherein the first set of PIM cores have greater processing power than the second set of PIM cores, wherein a second communication path couples the first set of PIM cores and the second set of PIM cores to the memory, wherein the second communication path has a greater bandwidth for data transfer than the first communication path, and wherein the device is configurable to execute a code offloaded by the one or more host cores in the first set of PIM cores and the second set of PIM cores.

In example 20, the subject matter of example 19 may include that the second set of PIM cores are greater in number than the first set of PIM cores, wherein the first set of PIM cores that have greater processing power than the second set of PIM cores are larger in size than the second set of PIM cores.

Example 21 is a system, comprising: means for configuring a device to be in communication with one or more host cores via a first communication path; means for configuring a first set of processing-in-memory (PIM) cores and a second set of PIM cores to be in communication with a memory included in the device over a second communication path, wherein the first set of PIM cores have greater processing power than the second set of PIM cores, and wherein the second communication path has a greater bandwidth for data transfer than the first communication path; and means for executing code offloaded by the one or more host cores in the first set of PIM cores and the second set of PIM cores.

All optional features of any of the systems and/or apparatus described above may also be implemented with respect to the methods or processes described above, and specifics in the examples may be used anywhere in one or more embodiments. Additionally, all optional features of the methods or processes described above may also be implemented with respect to any of the system and/or apparatus described above, and specifics in the examples may be used anywhere in one or more embodiments.

What is claimed is:

1. A device configurable to be in communication with one or more host cores via a first communication path, the device comprising:
    a substrate, comprising:
        a memory;
        a first set of processing-in-memory (PIM) cores;
        a second set of PIM cores, wherein the first set of PIM cores have greater processing power than the second set of PIM cores; and
        a second communication path coupling the first set of PIM cores and the second set of PIM cores to the memory, wherein the second communication path has a greater bandwidth for data transfer than the first communication path, and wherein the device is configurable to
    execute a code offloaded by the one or more host cores in the first set of PIM cores and the second set of PIM cores, wherein the first set of PIM cores have greater processing power and are larger in size than the second set of PIM cores, wherein first code segments of the code are determined to be suitable for sequential processing and are executed in the first set of PIM cores without returning the first code segments of the code to the one or more host cores, and wherein second code segments of the code are determined to be suitable for parallel processing and are executed in the second set of PIM cores.

2. The device of claim 1, wherein the second set of PIM cores are greater in number than the first set of PIM cores.

3. The device of claim 1, wherein a first set of tasks and a second set of tasks are generated from the code, wherein the first set of tasks are more suitable for processing on the host cores in comparison to the device, but code segments corresponding to the first set of tasks have been offloaded by the host cores to the device via the code, wherein the second set of tasks are more suitable for processing in the device in comparison to the first set of tasks, and wherein the first set of tasks are executed in the first set of PIM cores, and the second set of tasks are executed in the second set of PIM cores.

4. The device of claim 1, wherein the first set of PIM cores are powered down, in response to a determination that the first set of PIM cores are not being utilized, and wherein the second set of PIM cores are powered down, in response to a determination that the second set of PIM cores are not being utilized.

5. A method, comprising:
    configuring a device to be in communication with one or more host cores via a first communication path;
    configuring a first set of processing-in-memory (PIM) cores and a second set of PIM cores to be in communication with a memory included in the device over a second communication path, wherein the first set of PIM cores have greater processing power than the second set of PIM cores, and wherein the second communication path has a greater bandwidth for data transfer than the first communication path; and executing code offloaded by the one or more host cores in the first set of PIM cores and the second set of PIM cores, wherein the first set of PIM cores have greater processing power and are larger in size than the second set of PIM cores, wherein first code segments of the code are determined to be suitable for sequential processing and are executed in the first set of PIM cores without returning the first code segments of the code to the one or more host cores, and wherein second code segments of the code are determined to be suitable for parallel processing and are executed in the second set of PIM cores.

6. The method of claim 5, wherein the second set of PIM cores are greater in number than the first set of PIM cores.

7. The method of claim 5, the method further comprising:
generating a first set of tasks and a second set of tasks from the code;
determining that the first set of tasks are more suitable for processing on the host cores in comparison to the device, but code segments corresponding to the first set of tasks have been offloaded by the host cores to the device via the code;
determining the second set of tasks are more suitable for processing in the device in comparison to the first set of tasks;
executing the first set of tasks in the first set of PIM cores; and
executing the second set of tasks in the second set of PIM cores.

8. The method of claim 5, the method further comprising:
powering down the first set of PIM cores, in response to a determining that the first set of PIM cores are not being utilized; and
powering down the second set of PIM cores, in response to a determining that the second set of PIM cores are not being utilized.

9. A system, comprising:
one or more host cores;
a display; and
a device configurable to be in communication with the one or more host cores via a first communication path, the device comprising:
a substrate, comprising:
a memory;
a first set of processing-in-memory (PIM) cores;
a second set of PIM cores, wherein the first set of PIM cores have greater processing power than the second set of PIM cores; and
a second communication path coupling the first set of PIM cores and the second set of PIM cores to the memory, wherein the second communication path has a greater bandwidth for data transfer than the first communication path, and wherein the device is configurable to execute a code offloaded by the one or more host cores in the first set of PIM cores and the second set of PIM cores, wherein the first set of PIM cores have greater processing power and are larger in size than the second set of PIM cores, wherein first code segments of the code are determined to be suitable for sequential processing and are executed in the first set of PIM cores without returning the first code segments of the code to the one or more host cores, and wherein second code segments of the code are determined to be suitable for parallel processing and are executed in the second set of PIM cores.

10. The system of claim 9, wherein the second set of PIM cores are greater in number than the first set of PIM cores.

11. The system of claim 9, wherein a first set of tasks and a second set of tasks are generated from the code, wherein the first set of tasks are more suitable for processing on the host cores in comparison to the device, but code segments corresponding to the first set of tasks have been offloaded by the host cores to the device via the code, wherein the second set of tasks are more suitable for processing in the device in comparison to the first set of tasks, and wherein the first set of tasks are executed in the first set of PIM cores, and the second set of tasks are executed in the second set of PIM cores.

12. The system of claim 9, wherein the first set of PIM cores are powered down, in response to a determination that the first set of PIM cores are not being utilized, and wherein the second set of PIM cores are powered down, in response to a determination that the second set of PIM cores are not being utilized.

13. A method for manufacturing a device configurable to be in communication with one or more host cores via a first communication path, the method comprising:
placing a memory in a first area of a substrate; and
subdividing a second area of the substrate to store a first set of processing-in-memory (PIM) cores and a second set of PIM cores, wherein the first set of PIM cores have greater processing power than the second set of PIM cores, wherein a second communication path couples the first set of PIM cores and the second set of PIM cores to the memory, wherein the second communication path has a greater bandwidth for data transfer than the first communication path, and wherein the device is configurable to execute a code offloaded by the one or more host cores in the first set of PIM cores and the second set of PIM cores, wherein the first set of PIM cores have greater processing power and are larger in size than the second set of PIM cores, wherein first code segments of the code are determined to be suitable for sequential processing and are executed in the first set of PIM cores without returning the first code segments of the code to the one or more host cores, and wherein second code segments of the code are determined to be suitable for parallel processing and are executed in the second set of PIM cores.

14. The method for manufacturing of claim 13, wherein the second set of PIM cores are greater in number than the first set of PIM cores.

* * * * *